United States Patent Office 2,944,084
Patented July 5, 1960

2,944,084

SODIUM TETRAETHYLBORON

Sidney M. Blitzer and Tillmon H. Pearson, Baton Rouge, La., assignors to Ethyl Corporation, New York, N.Y., a corporation of Delaware No Drawing. Filed Nov. 3, 1958, Ser. No. 771,213

1 Claim. (Cl. 260—606.5)

The present invention is concerned with a new composition of matter, namely sodium tetraethylboron.

Certain complex metal organoboron compounds have been known for quite some time. For example, the lithium, sodium, or potassium triphenyl borohydrides have been produced. Additionally, certain lithium hydrocarbon borane compounds have been prepared. The compounds which have been previously prepared are primarily of academic interest and as yet of no commercial utility. Further, the compounds suffer certain inherent disadvantages including poor stability, high reactivity and low solubility in ordinary commercial organic solvents. Sodium tetraphenylboron is the only commercially available metal organoboron compound. This compound is of limited useage, primarily as an analytical reagent, and is a comparatively poor arylating agent. Accordingly, it is desirable to obtain a metal organoboron compound which is both economical and of practical utility.

Thus, an object of this invention is to provide a novel composition of matter. Specifically, the object of this invention is to provide the novel compound, sodium tetraethylboron.

Sodium tetraethylboron is a unique compound, having additional and diverse uses over the previously known analogous prior art compounds. Sodium tetraethylboron is readily prepared by merely admixing ethylsodium with triethylborane. Generally, temperatures between about 0° to 100° C. are employed.

Sodium tetraethylboron is a unique metal organoboron compound in that it is of high stability yet very reactive, exhibits high solubility in various organic solvents and is more stable to moisture than comparable prior art organometallic compounds. Thus, this compound is a more advantageous material to be employed in alkylating reactions as, for example, its reaction with a lead halide to form tetraethyllead. Higher yields are obtained in such a reaction than when employing other organometallic compounds without the attendant difficulties of close control of exposure to the atmosphere and degradation of the tetraethyllead with by-product halides. Still other advantages of the product will be evident.

The following example will demonstrate the novel product of this invention and one method for its production. It is to be understood that the present invention is not restricted in any way by the manner in which sodium tetraethylboron is formed since other modes of preparation will be evident. In the following examples, all parts are by weight.

*Example I*

To a reactor equipped with internal agitation, external heating and cooling means and a means for maintaining an inert atmosphere was added a dispersion of finely divided sodium, 8 parts, in 175 parts of 2,2,5-trimethylhexane. Then 35 parts of diethylmercury in 100 parts of 2,2,5-trimethylhexane was added to the dispersion with the temperature at 20° C. during addition. The reaction mixture was then permitted to warm to room temperature and agitation commenced. These conditions were maintained for 4½ hours wherein a heterogenous white and dark solid was filtered from the reaction mixture. This solid was then readmitted to a similar reactor in 175 parts of 2,2,5-trimethylhexane, then 27.8 parts of triethylborane was added thereto with agitation. At the end of 16 hours, the solids were filtered and washed with 2,2,5-trimethylhexane. The solids were then washed with diethyl ether to dissolve any sodium tetraethylboron contained therein. In this manner, the sodium tetraethylboron was obtained in high yield.

*Example II*

To the reactor of Example I was added 35.3 parts of triethylborane and 46.6 parts of diethylmercury in 283 parts of diethyl ether. This mixture was stirred and then 8.3 parts of sodium was added over a period of two hours at 5 to 10° C. The mixture was then allowed to warm to room temperature and agitated for 22 hours. The dark solid product obtained in the mixture was filtered off and washed with ether. The filtrates were cooled to a $-78°$ C. wherein colorless needles crystallized out. The product was then recrystallized from ether and then dried at room temperature and 2½ millimeters of mercury. Upon recrystallizing the product and drying at 120° C. and 1 to 2 millimeters mercury pressure, all of the ether was removed from the product leaving a 70 percent yield of 98 percent pure crystalline material analyzing 7.1 parts boron and 14.8 parts sodium (calculated for sodium tetraethylboron: 7.2 parts boron and 15.3 parts sodium).

Sodium tetraethylboron sublimes at 160–170° C. at 1 to 2 millimeters of mercury, is highly soluble in ethers, slightly soluble in hydrocarbons, and has a molecular weight of 150.1. Additionally, it decomposes violently with acids.

Sodium tetraethylboron is a good alkylating agent for the formation of organo metal products. For example, when it is reacted with lead oxide according to the process of copending application S.N. 496,919, filed Mar. 25, 1955, tetraethyllead is obtained in high yield. It can also be reacted with aldehydes and ketones to form carbinols. For example, when it is reacted with benzophenone, diphenylethyl carbinol is obtained which is useful as an intermediate for pharmaceuticals. Sodium tetraethylboron can also be reacted with acetone to produce tertiary amyl alcohol. Other uses of the product will be evident.

This application is a continuation-in-part of application S.N. 496,919 filed Mar. 25, 1955, now U.S. Patent 2,859,225.

Having described the product of this invention, it is not intended that it be limited except as set forth in the following claim:

We claim:

Sodium tetraethylboron.

References Cited in the file of this patent

UNITED STATES PATENTS 2,729,540      Fisher  ---------------- Jan. 3, 1956